United States Patent
Zimmerman, Jr. et al.

(10) Patent No.: US 8,738,426 B2
(45) Date of Patent: *May 27, 2014

(54) TAXONOMY BASED TARGETED SEARCH ADVERTISING

(71) Applicant: DataPop, Inc., Los Angeles, CA (US)

(72) Inventors: Stephen John Zimmerman, Jr., Los Angeles, CA (US); Jonathan Warden, Chicago, IL (US)

(73) Assignee: Datapop, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,608

(22) Filed: Jul. 3, 2013

(65) Prior Publication Data
US 2013/0297419 A1    Nov. 7, 2013

Related U.S. Application Data

(63) Continuation of application No. 13/424,373, filed on Mar. 19, 2012.

(60) Provisional application No. 61/453,954, filed on Mar. 17, 2011.

(51) Int. Cl.
*G06Q 30/00* (2012.01)

(52) U.S. Cl.
USPC ............................................ 705/14; 705/10

(58) Field of Classification Search
USPC .......................................................... 705/14
See application file for complete search history.

(56) References Cited

U.S. PATENT DOCUMENTS

| | | | |
|---|---|---|---|
| 8,311,997 B1* | 11/2012 | Kauchak et al. | 707/705 |
| 2005/0055271 A1 | 3/2005 | Axe et al. | |
| 2005/0114198 A1* | 5/2005 | Koningstein et al. | 705/10 |
| 2008/0097842 A1 | 4/2008 | Tirumala et al. | |
| 2010/0049504 A1* | 2/2010 | Rajan et al. | 704/10 |
| 2011/0106642 A1 | 5/2011 | Hassan et al. | |
| 2012/0066057 A1 | 3/2012 | Ramer et al. | |
| 2012/0095828 A1 | 4/2012 | Evankovich et al. | |
| 2012/0239488 A1 | 9/2012 | Zimmerman et al. | |
| 2013/0110627 A1* | 5/2013 | Guha | 705/14.54 |

* cited by examiner

*Primary Examiner* — Alvin L Brown
(74) *Attorney, Agent, or Firm* — KPPB LLP

(57) ABSTRACT

Campaign creation systems and methods for building taxonomy based targeted search advertising campaigns in accordance with embodiments of the invention are disclosed. One embodiment of the invention includes obtaining source data describing a plurality of landing pages, obtaining a list of keywords using the campaign creation server system, where the list of keywords comprises keyword component, building a taxonomy using the source data and the initial list of keywords, where the taxonomy uniquely maps the plurality of landing pages to categories and attributes and maps the keyword components to the categories and attributes, mapping keywords to relevant offers based on the taxonomy, automatically generating adgroups based on the offers and relevant keywords, where each adgroup includes a landing page, at least one creative and at least one keyword, and deploying the adgroups to a search engine provider.

24 Claims, 8 Drawing Sheets

TAXONOMY BASED TARGETED SEARCH ADVERTISING

CROSS-REFERENCE TO RELATED APPLICATION

The present invention is a continuation of U.S. application Ser. No. 13/424,373 filed Mar. 19, 2012 which application claimed the benefit under 35 U.S.C. §119(e) of the filing date of U.S. Provisional Application Ser. No. 61/453,954 entitled "Taxonomy Based Targeted Search Advertising" to Zimmerman et al. filed Mar. 17, 2011, the disclosure of which is incorporated by reference herein in its entirety.

FIELD OF THE INVENTION

The present invention relates to targeted search advertising and more specifically to the use of a taxonomy to build a targeted search advertising campaign.

BACKGROUND

The term e-commerce is used to refer to the buying and selling of products or services over electronic systems such as the Internet and other computer networks. The amount of trade conducted via e-commerce has grown extraordinarily with widespread Internet usage. As a result, a variety of websites have been established to offer goods and services. A common configuration for such a website is to present each individual good or service on a separate landing page. Such websites also typically organize the goods and/or services offered in a hierarchy and feature categories of goods and/or services on separate landing pages.

Search engines are useful tools for locating specific pages of information on the World Wide Web and are increasingly used to locate goods and services. As a result, many websites use search advertising/search engine marketing to attract visitors to product, service and/or category landing pages. Search advertising describes the placement of online advertisements adjacent or amongst the search results returned by a search engine in response to a specific search query. Search engine marketing typically involves paying for a specific online advertisement or creative to be featured in or adjacent to the search results provided in response to a specific query. The creative typically includes a link to a specific landing page. In many instances, the provider of the search engine derives revenue when a user of the search engine uses the link within the creative to navigate to the landing page. In addition, the amount of money paid is often the result of a bidding process. Typically, the position of an advertisement within the returned search results is a function of the bid scaled by a quality factor that measures the relevance of the creative and landing page combination to the search query. Accordingly, the provider of the search engine is incentivized to feature relevant keyword/advertisement/landing page combinations so that users will select featured advertisements and increase the revenue generated by the search engine provider. In the context of paid search advertising, the term keyword refers to both a single word and a specific combination of words or keyword components.

When a website includes a large number of products or services, the process of building and managing a paid search advertising campaign can be quite complex. Many search engines provide the ability to upload an entire campaign including one or more creatives that target a set of keywords, and associated bids to be used when the display of the creative is triggered by specific keywords. For example, Google, Inc. of Mountain View, Calif., defines an Ad Group file format that enables advertisers to upload paid search advertising campaigns.

Leading search engine providers offer a variety of different match types when building a paid search advertising campaign. Keyword matching options or match types specify the similarity required between a keyword in a search query and a keyword specified in a paid search advertising campaign in order to trigger the display of a creative. Google, Inc. provides four different match types. "Broad match" matches keywords to similar phrases and relevant variations in a search query. "Modified Broad Match" is similar to "broad match", but with the restriction that at least one specified keyword component or a close variant must match exactly within the search query. "Phrase match" requires that the keyword be present within the query exactly. "Exact match" requires that the keyword and the search query match exactly. In addition to the four match types, "negative matches" can also be specified to prevent a creative from being displayed when a specific keyword is present.

SUMMARY OF THE INVENTION

Campaign creation systems and methods for building taxonomy based targeted search advertising campaigns in accordance with embodiments of the invention are disclosed. One embodiment of the invention includes obtaining source data describing a plurality of landing pages using a campaign creation server system, obtaining a list of initial keywords using the campaign creation server system, where the keywords in the initial list of keywords comprise keyword component, building a taxonomy based on the source data and the initial list of keywords using the campaign creation server system, where the taxonomy uniquely maps the plurality of landing pages to categories and attributes and maps the keyword components to the categories and attributes, mapping keywords to relevant offers based on the taxonomy using the campaign creation server system, automatically generating adgroups based on the offers and relevant keywords using the campaign creation server system, where each adgroup includes a landing page, at least one creative and at least one keyword, an deploying the adgroups to a search engine provider using the campaign creation server system.

A further embodiment also includes generating the at least one creative based upon the attributes of an offer using the campaign creation server system, and including the at least one creative in the adgroup associated with the offer using the campaign creation server system.

Another embodiment of the invention also include identifying a landing page based upon the attributes of an offer using the campaign creation server system, and including the landing page in the adgroup associated with the offer using the campaign creation server system.

A still further embodiment also includes generating source data by crawling the plurality of landing pages to identify pieces of information within the landing pages selected from the group consisting of information concerning products and information concerning services using the campaign creation server system.

Still another embodiment also includes generating source data by crawling landing pages within the plurality of landing pages that contain category information using the campaign creation server system.

In a yet further embodiment, building a taxonomy that maps keywords to specific landing pages within the plurality of landing pages comprises defining categories within the taxonomy based on the category information obtained by crawling the landing pages that contain category information using the campaign creation server system.

Yet another embodiment also includes obtaining source data using the search results pages returned by performing a search of the plurality of landing pages using relevant keywords using the campaign creation server system.

A further embodiment again also includes generating additional source data by determining additional attributes associated with the landing pages using a semantic reasoner.

In another embodiment again, obtaining a list of relevant keywords comprises generating a list of relevant keywords using at least one source selected from the group consisting of search logs and a keyword tool using the campaign creation server system.

In a further additional embodiment, each category is identified using a category name.

In another additional embodiment, the attributes are specified as key/value pairs.

In a still yet further embodiment, the taxonomy includes a set of categories and attribute values that describe products, which are the subject of offers within the plurality of landing pages.

In still yet another embodiment, each product described within a landing page is identified using a unique identifier that is derived from at least one attribute that describes the product.

In as still further embodiment again, the taxonomy uniquely maps the plurality of landing pages to categories and attributes by mapping each landing page in the plurality of landing pages maps to a unique combination of category name and attribute values.

In still another embodiment again, the taxonomy maps each keyword component to an individual category name or attribute value.

In a still further additional embodiment, mapping keyword components to categories and attributes within the taxonomy comprises expanding the taxonomy to include new category and attribute values to accommodate new keyword components.

In still another additional embodiment, a grammar-less parser is used to parse the keywords into keyword components using the taxonomy.

In a yet further embodiment again, the categories are arranged as a hierarchy of categories with associated attributes.

In yet another embodiment again, the taxonomy supports recursive definition of a first category as an attribute of a second category.

In a yet further additional embodiment, building a taxonomy that maps relevant keywords to specific landing pages within the plurality of landing pages includes identifying concepts representing unique combinations of categories and attribute values within the taxonomy using the campaign creation server system, and predicting keywords that are relevant to the identified concepts using the campaign creation server system.

In yet another additional embodiment, a predetermined maximum number of attributes is used when identifying concepts using the campaign creation server system.

In a further additional embodiment again, identifying concepts representing unique combinations of categories and attribute values include identifying surface concepts using unique concepts of categories and attribute values, identifying deep concepts to which at least one surface concept is subordinate, and predicting keywords that are relevant to the identified concepts comprises predicting keywords that are relevant to the identified deep concepts.

In another additional embodiment again, identifying deep concepts further comprises inferring attributes of a deep concept based upon the attributes of a plurality of surface concepts.

In another further embodiment, the identified concepts comprise at least one intent concept.

In still another further embodiment, predicting keywords that are relevant to the identified concepts further comprises generating a set of keywords using keyword components within the taxonomy that are associated with the category name and attribute values that form the basis of the concept.

In yet another further embodiment, generating a set of keywords using keyword components within the taxonomy that are associated with the category name and attribute values that form the basis of the concept further comprises generating keywords using the keyword components based upon grammar patterns.

In another further embodiment again, the grammar patterns are associated with specific category names and attribute values within the taxonomy.

In another further additional embodiment, at least one of the grammar patterns include a grammar component and a semantic component.

In still yet another further embodiment, at least one keyword is generated by combining the semantic components of a plurality of grammar patterns in accordance with the grammar components of the grammar patterns.

In still another further embodiment again, predicting keywords that are relevant to the identified concepts further includes estimating keyword search volume using search volumes associated with the grammar patterns and keyword components used to generate the keyword, and filtering keywords for relevancy to an identified concept based upon the estimated keyword search volume.

In still another further additional embodiment, identifying targets comprises identifying at least one target for each relevant keyword based on the relevant keyword and at least one other targeting criteria using the campaign creation server system.

In yet another further embodiment again, the at least one other targeting criteria is selected from the group consisting of keyword match type, language in a query indicative of intent, geographic location, profile information, language, and information derived from a cookie contained within a browser application from which the search query originated.

Yet another further additional embodiment also includes identifying at least one target for each identified concept within the taxonomy using the campaign creation server system.

In another further additional embodiment again, building a taxonomy that maps relevant keywords to specific landing pages within the plurality of landing pages comprises mapping offer concepts to landing pages by matching the attributes of the offer concepts to the attributes of the landing pages using a campaign creation server system.

In a further embodiment, mapping offer concepts to landing pages further comprises mapping a landing page to an offer concept based upon the precision and the recall of the landing page.

In another embodiment, the precision of a landing page is the number of products on the landing page sharing the attributes of an offer concept as a percentage of the number of products on the landing page.

In a still further embodiment, the recall of a landing page is the number of products on the landing page sharing the attributes of the offer concept as a percentage of the total number of products listed on the plurality of landing pages that share the attributes of the offer concept.

In still another embodiment, building a taxonomy that maps relevant keywords to offers further comprises testing a number of landing pages to determine which is the most effective for a specific target and offer combination.

In another further embodiment, adgroups are generated including creatives that are automatically generated using the attributes of the offer associated with the adgoup.

In still another further embodiment, the creatives are generated based upon templates defined with respect to an adgroup.

In a yet further embodiment, automatically generating adgroups further includes generating an adgroup for a target concept, where the adgroup includes keywords relevant to the target concept using the campaign creation server system.

In a further embodiment again, the concept to which the landing page is mapped is a target concept.

In another embodiment again, the concept to which the landing page is mapped is an offer concept.

In a further additional embodiment, the keywords included in the adgroup are the keywords predicted to be relevant to a target concept.

In another additional embodiment, a plurality of creatives is included in the adgroup.

A still yet further embodiment also includes generating a plurality of creatives based upon a template and the attributes of an offer concept targeted by a target concept using the campaign creation server system.

In still yet another embodiment, the targeting attributes associated with a list of keywords and creatives includes at least one attribute selected from the group consisting of the match type of the keyword, the geographic location of the user, information derived from a cookie located within the browser application used to submit the search query, and information derived from a user profile.

In a still further embodiment again, the offer concept is selected for a specific target based upon the estimated performance of the offer concept with respect to search queries targeted by the specific target.

In still another embodiment again, the performance of the plurality of creatives with respect to each target is tested and used to refine the selection of the specific creative to display with respect to a specific target.

In a still further additional embodiment, automatically generating adgroups further includes associating a specific landing page with an offer concept using the campaign creation server system, and associating an offer concept with at least one creative.

Yet another additional embodiment also includes identifying new keywords targeted by the adgroups and updating the taxonomy based upon the new keywords using the campaign creation server system.

DETAILED DESCRIPTION

Figure 1:
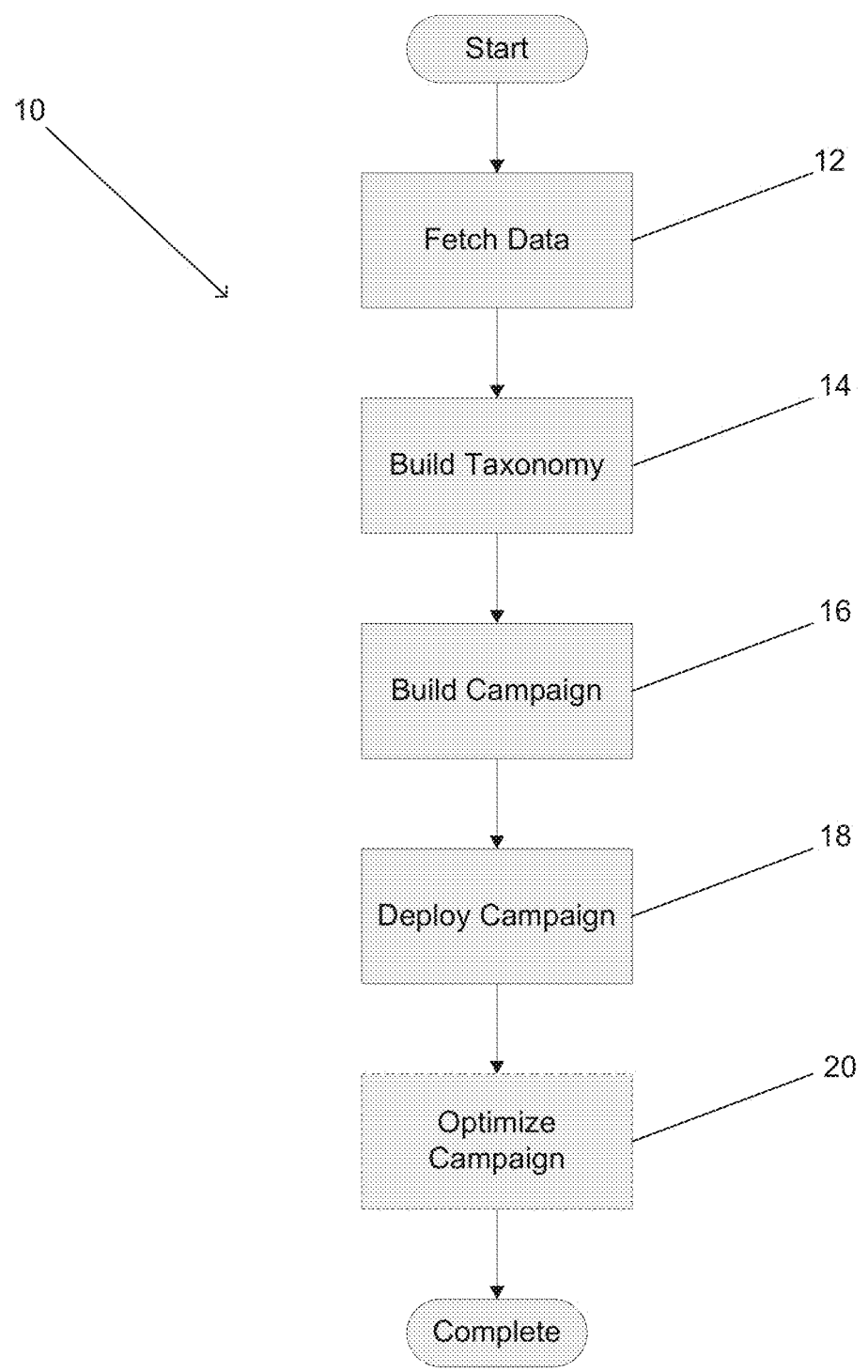
FIG. 1 is a flow chart illustrating a process for building a targeted search advertising campaign using a taxonomy in accordance with an embodiment of the invention.

Turning now to the drawings, campaign creation systems and methods for building taxonomy based targeted search advertising campaigns in accordance with embodiments of the invention are illustrated. The term taxonomy is used to describe a particular scheme for classifying products and/or services. Collectively products and/or services (indeed any object, person, idea, or action) can be referred to as a concept and, in many embodiments, concepts can be defined in terms of categories and attribute value pairs. In this way, a taxonomy used to build targeted search advertising campaigns can also include elements of an ontology in the sense that the possible attributes of classified concepts can also be specified as can the relationships between those attributes. In several embodiments, a taxonomy is constructed based upon keywords actually used by people searching for the specific products and/or services that are featured in an advertising campaign. In many embodiments, the taxonomy is used to relate landing pages within a website or group of websites to categories and attributes. The taxonomy can also be used to identify relationships between keyword components and the categories and attributes within the taxonomy and these relationships used to identify potentially relevant keywords for use in targeting a search advertising campaign with respect to specific concepts defined by the categories and attributes within the taxonomy. Effective or optimal creatives can then be automatically generated based upon the attributes of offers that are likely to perform well with respect to specific queries targeted by the search advertising campaign. An offer can be considered to be the attributes of what is being offered or presented to the user by the targeted search campaign. An offer can include product and/or service related attributes and can include non-product/service related attributes, such as reviews. As is discussed further below, the set of attributes that define the offer can be utilized to identify landing pages relevant to a targeted search query and to generate one or more creatives to display in response to the targeted search query. In several embodiments, relevant landing pages are determined using the offer attributes based upon their precision and recall. In a number of embodiments, relevant queries can be targeted more effectively by defining targets using keyword, keyword match type and/or additional targeting criteria such as (but not limited to) the geographic location from which the search query originated, information collected by cookies in a browser application, and/or information within a user profile. In this way, an entire targeted search advertising campaign can be built specifying which creative/ landing page combination to trigger in response to specific search queries.

In a number of embodiments, a set of products and/or services (i.e. concepts) advertised via one or more websites along with a list of keywords relevant to the products and/or services are processed to generate a taxonomy. In a number of embodiments, the possible keywords include known keywords and keywords generated by combining keyword components from known keywords using known grammar patterns. The set of possible keywords is often referred to as the keyword space. In several embodiments, the taxonomy maps the keywords in the keyword space to distinct concepts, and offer concepts can be identified within the taxonomy that map to one or more creatives and one or more landing pages.

A taxonomy generated in accordance with embodiments of the invention can be utilized to build a campaign. The campaign includes a set of adgroups. The adgroups provide search engine providers with information concerning the creative and landing page combination to display when a specific query occurs (i.e. in response to a specific target). Each adgroup typically includes a landing page, at least one creative, and at least one target. Although, any adgroup can be constructed appropriate to the requirements of a specific search engine provider in accordance with embodiments of the invention. A creative is the specific advertisement that is displayed as part of the search engine results and different creatives can be displayed with respect to the same landing page in response to different targeted search queries. Targets define the search queries targeted by the adgroup and can be defined in terms of any attribute of a search query including but not limited to keywords within the search query, keyword match type, and additional information that can derived from the search query such as the IP address from which the search query originated, cookies in the browser application used to provide the search query, and profile information associated with the user that submitted the search query. Once a campaign is deployed, the selection of creative and landing pages that are displayed in response to a keyword match can be refined to improve the performance of the overall campaign. The generation of targeted search advertising campaigns using taxonomies in accordance with embodiments of the invention is discussed further below.

Building Targeted Search Campaigns

A process for building a targeted search campaign using a taxonomy in accordance with an embodiment of the invention is illustrated in FIG. 1. The process 10 can be performed by a campaign creation server system and includes fetching (12) data related to landing pages included in the website or websites that are being promoted by the campaign and data related to the manner in which people search for the products and/or services that are featured by the website or websites. In several embodiments, the landing pages can include category landing pages and specific product landing pages. In many embodiments, the fetched data includes a list of keywords. As discussed below, the keywords can be used to define a keyword space based upon the list of keywords and a set of keywords generated using the keyword components of the keywords in the fetched data and known grammar patterns. The fetched data is used to build (14) a taxonomy that maps landing pages to categories and attribute values. The taxonomy also maps keyword components to specific category and attribute values. Building a campaign (16) using the taxonomy involves identifying concepts that can be targeted by the search advertising campaign based upon the categories and attributes within the taxonomy. The taxonomy can then be used to identify keywords from within the keyword space that are potentially relevant to the targeted concepts using grammar patterns and keyword components that are mapped to the category and attributes that form the basis of the concept. These potentially relevant keywords can be used to define targets for a search advertising campaign. The building of the campaign is completed by identifying the attributes of offers that are likely to perform well with respect to each of the targets (e.g. yield the highest click throughs, conversion, and/or revenue). The attributes of the offers can then be used to select landing pages and to generate creatives. As is discussed further below, the process of building a campaign in accordance with many embodiments of the invention can involve the automatic generation of creative, landing page and target combinations. Once an offer is identified for each target and used to generate a landing page, creative, and target combination, the campaign can be deployed (18) to one or more search engine providers. In a number of embodiments, the performance of the campaign is monitored and the choice of landing page and creative for specific targets is modified in response to the performance of the campaign.

Although a specific process for building a paid search advertising campaign using a taxonomy is illustrated in FIG. 1, any of a variety of processes can to build a taxonomy and to generate a paid search advertising campaign using the taxonomy can be utilized in accordance with embodiments of the invention. Although much of the discussion that follows refers to products and categories of products, targeted advertising campaigns in accordance with embodiments of the invention can be utilized to target advertising to concepts other than products including (but not limited to) concepts related to services. The creation of a taxonomy, the use of the taxonomy to build a campaign, the automatic generation of creatives, and the optimization of deployed campaigns in accordance with embodiments of the invention are discussed further below.

Generating a Taxonomy

Construction of a targeted search advertising campaign for a number of landing pages in accordance with an embodiment of the invention involves building a taxonomy that can be used to categorize all relevant keywords. In several embodiments, the taxonomy is a lexicon or vocabulary of how people actually search for the specific products and services that are being featured by the advertising campaign. The taxonomy maps keyword components to a specific category or attribute in the taxonomy. In many embodiments, the taxonomy includes categories arranged hierarchically (e.g. Furniture/ Chairs/Wood) and one or more attributes defined using key/ value pairs (e.g. Material: Birch). When the taxonomy is organized as a hierarchy of categories with associated attributes, the taxonomy can map keyword components to specific category names or attribute values. In other embodiments, a taxonomy can be organized in any manner appropriate to the specific application. For example, the taxonomy can include recursion support and triples, and/or more complex descriptive structures can be used in place of key/value pairs to define attributes.

Obtaining Categories and Attributes from Source Data

The process of building a taxonomy in accordance with many embodiments of the invention involves obtaining a set of source data describing the products and categories of products featured on the website or group of websites that will be the subject of the campaign. In many embodiments, an initial crawl of the website or group of websites is performed. Typical crawls can include but are not limited to a product crawl, which pulls key pieces of information about each product, and a category crawl, which determines the categorization structure of the website or group of websites. In a number of embodiments, a filter crawl is also performed to obtain all relevant product filters on the site. In many embodiments, search results pages returned by the site in response to search queries based upon keywords of interest are also crawled and the search results pages used as landing pages within a targeted search campaign. In certain embodiments, the site categorization structure becomes the basis of category definitions within the taxonomy. In effect, the source data provides information concerning the attributes of the products and/or services that can be presented to a user by the landing pages that are the subject of the advertising campaign. In addition to information about the products and/or services, the source data can also include information concerning search queries such as search logs, reports, keyword tools, and search query reports. In other embodiments, any of a variety of sources of data can be used to obtain information related to the attributes of products and/or services that will be presented in the paid search campaign. For example, a semantic reasoner or inference engine can be utilized to determine additional attributes associated with products and/or services. Accordingly, any of a variety of sources of data concerning the attributes of products and/or services can be utilized in the generation of a taxonomy as appropriate to the requirements of a specific application in accordance with embodiments of the invention.

In many embodiments, the source data is processed to build a hierarchical taxonomy including a complete set of categories and attribute values that describe all of the products and/or services featured within the landing pages. In several embodiments, the taxonomy is constructed in such a way that each landing page maps to a unique combination of category and attributes. As noted above, the category hierarchy can be generated automatically utilizing the scraped website(s) categorization structure and/or manually. The attribute values can also be added to the taxonomy automatically and/or by hand. In several embodiments, specific products within the source data are not allocated a unique source data ID. Instead, a key attribute or combination of attributes or a hash of the key attribute or combination of attributes is used as a unique identifier, which can be referred to as the source data ID, to identify each product. In many embodiments, the key attribute is one or a combination of (or a hash of one or combination of) product ID, SKU, or URL. In the absence of such attributes, the key attributes can be a top-level category name combined with a subcategory name, or city name combined with a state code. In this way, the campaign can change as the landing pages change.

Although much of the discussion that follows refers to taxonomies constructed using a combination of category names and attribute values, the category names can themselves be thought of as attribute values. Accordingly, the entire taxonomy at an abstract level can be considered to use attribute values to categorize landing pages within a site or group of sites.

Mapping Keyword Components to Attributes and Taxonomy Generation

The process of building a taxonomy in accordance with embodiments of the invention also involves parsing relevant search keywords into keyword components that are the same as or are synonymous with category names or attribute values within the taxonomy. As noted above, the term keyword in the context of targeted search advertising can refer to a single word or a combination of words. A keyword component refers to a single term within a keyword, such as "chair" or "bar stool", that can be mapped to a single category name or attribute value within the taxonomy. In many instances, multiple synonymous keyword components are mapped to the same category name or attribute value within the taxonomy. Where the keyword component is neither the same nor a synonym of a category name or attribute value within the taxonomy, a decision can be made concerning whether to discard the keyword component or to expand the taxonomy to include the keyword component. In several embodiments, sources of keywords can include manual collection of keywords and/or the automated collection of keywords.

Figure 2:
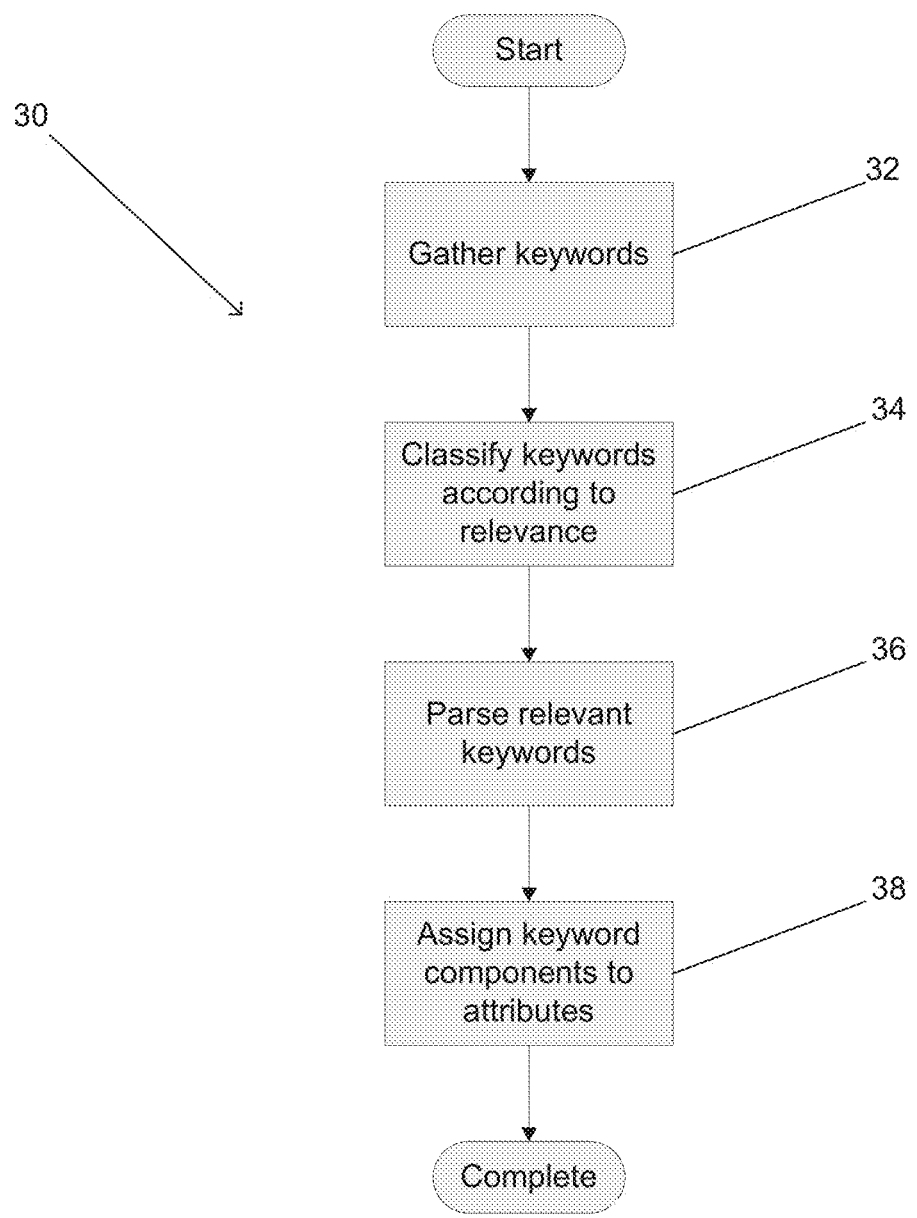
FIG. 2 is a flow chart illustrating a process for mapping keyword components to attribute values within a taxonomy in accordance with an embodiment of the invention.

A process for mapping keyword components from relevant keywords to attribute values within a taxonomy in accordance with an embodiment of the invention is illustrated in FIG. 2. The process 30 involves collecting (32) possibly relevant keywords and then classifying (34) the keywords according to their relevance. Relevant keywords can be obtained from a variety of sources including but not limited to search logs and keyword tools. In many embodiments, determining the relevance of keywords is a human intelligence task (i.e. a task performed by a human operator). Relevant keywords are parsed (36) to break them into components that match categories and attribute values within the taxonomy. Parsing of keywords into keyword components is described below. In many embodiments, when the keyword component matches multiple categories or multiple attribute values within the taxonomy, the keyword component can be mapped to each In other embodiments, this ambiguity may be resolved with a human intelligence task (i.e. a task requiring the involvement of a human), or by using any number of algorithms that can resolve ambiguity. If a keyword component doesn't match the taxonomy, then a determination is made concerning whether the keyword component is synonymous with an existing category name or attribute value, or whether the keyword component represents an entirely new attribute value. There are a number of algorithms that can guess what category or attribute value a keyword component may be synonymous with, or that can resolve ambiguity. For example, a thesaurus, or the similarity of the letters in the word to the letters in the category/attribute value or its synonyms. To resolve ambiguity, a data source such as Wikipedia disambiguation pages or using machine learning techniques using examples of other correctly-disambiguated keywords may be used. This determination can be automated or automated in combination with validation as a human intelligence task. When the keyword component represents a new attribute value, the taxonomy is expanded (38) to accommodate the new keyword component. As discussed above, many taxonomies utilize a hierarchy of categories and a number of different attributes can be used to describe a specific category. Therefore, expanding the taxonomy can involve adding a new category, attribute and/or attribute value to the taxonomy. In this way, the taxonomy can continue to expand with the goal of mapping all relevant keyword components to a category name or attribute value within the taxonomy.

Although a specific process for mapping relevant keyword components to category names or attribute values is illustrated in FIG. 2, any of a variety of processes appropriate to specific applications can also be utilized in accordance with embodiments of the invention including processes that can be performed automatically and/or manually.

Parsing Keywords into Keyword Components

In many embodiments, parsing of keywords involves the use of a grammar-less parser, which utilizes the taxonomy to parse the keywords into keyword components instead of a grammar. Components of the keywords map to category names and attribute values within the taxonomy. Therefore, the taxonomy can be used to identify grammatical rules. As is discussed further below, grammatical rules that are learned during the parsing of keywords can be used to predict "new" or previously unseen keywords in accordance with embodiments of the invention. These predicted keywords can be incorporated into a targeted search campaign so that the campaign is not limited to only those keywords included in the source data.

Although the use of grammar-less parsing is discussed above, a parser that utilizes a grammar and/or any of a variety of other parsers can be utilized in accordance with embodiments of the invention to parse keywords into keyword components.

Figure 3:
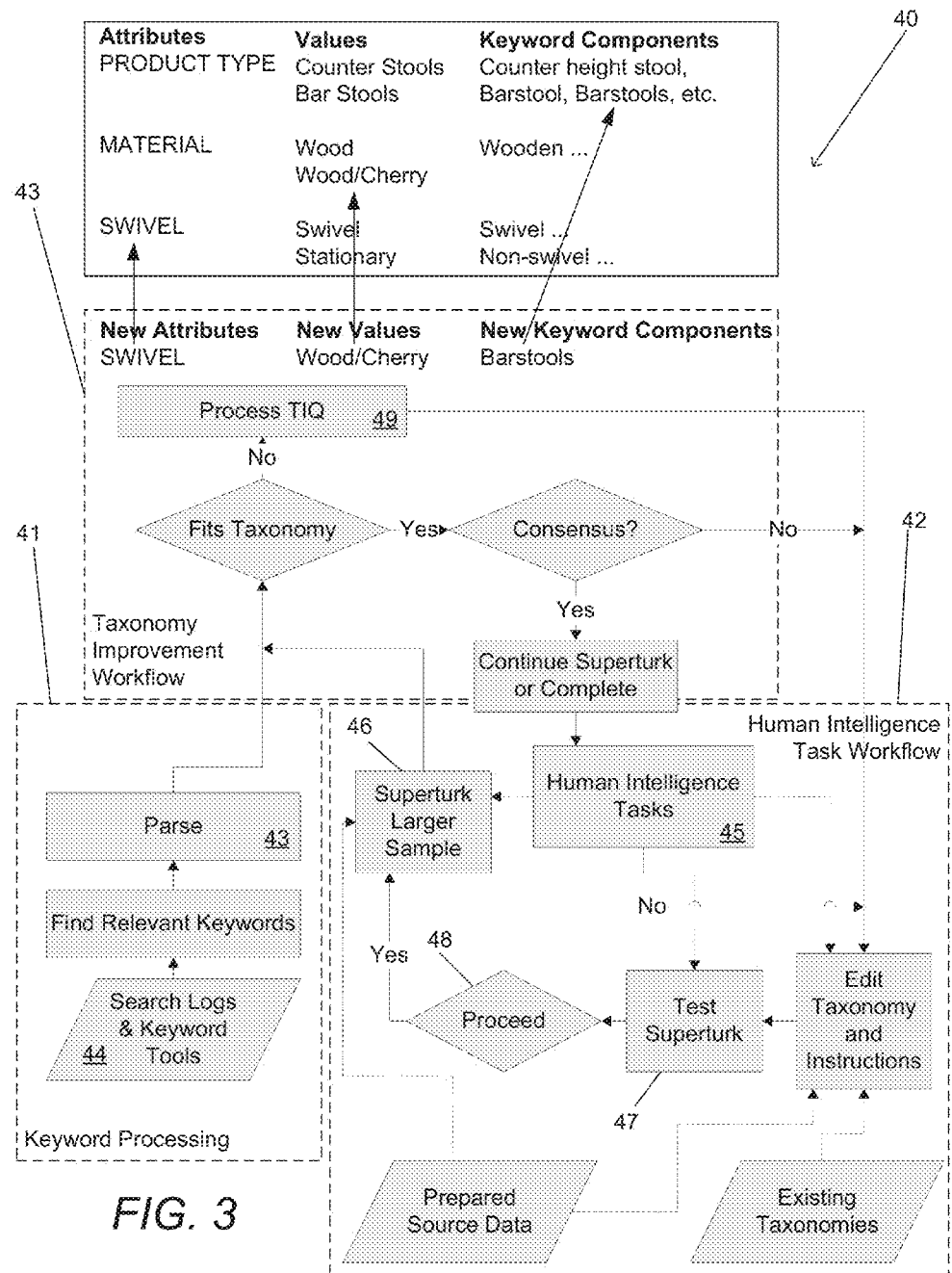
FIG. 3 is a flow chart conceptually illustrating work flows associated with building and refining a taxonomy using a combination of automated and human intelligence tasks in accordance with embodiments of the invention.

Taxonomy Creation Using a Combination of Automation and Human Intelligence Tasks The process of building a taxonomy from source data, obtaining sources of relevant keywords and then mapping each keyword or keyword component to a category name or attribute value within the taxonomy can be complex. In many embodiments the process is automated. In several embodiments, a hybrid approach to building a taxonomy is utilized combining both automation and human intelligence tasks. A workflow for building a taxonomy with the assistance of human decision makers is illustrated in FIG. 3. The workflow process 40 shown in FIG. 3 utilizes the Mechanical Turk marketplace provided by Amazon.com, Inc. of Seattle, Wash. for the performance of human intelligence tasks associated with the creation of the taxonomy. The workflow process 40 includes three basic workflows. A keyword processing workflow 41, a human intelligence task workflow 42 and a taxonomy improvement workflow 43.

The keyword processing workflow 41 is similar to the process illustrated in FIG. 2 (described above) and basically involves parsing (43) keyword components from keywords obtained from keyword sources (44) and identifying keyword components that are ambiguous or not already mapped to an attribute value within the taxonomy. The handling of ambiguous or "new" keyword components can involve automated processes and/or human intelligence tasks.

In the illustrated embodiment, the human intelligence task workflow 42 involves providing the "turks" (i.e. the people performing the human intelligence tasks (45)) with templates in which the turks can enter attribute data for each product and/or service landing page, and for each category landing page. In addition to providing templates, instructions are typically also provided concerning the meaning of each attribute in the taxonomy to increase the likelihood that attribute information is entered consistently. The turks then process (46) all of the source data concerning the products and/or services, which involves entering the different attribute values for the products and/or services featured in the landing pages into the templates. In many embodiments, the human intelligence tasks are performed by the turks on a small sample (47) and the taxonomy, templates, and/or instructions are refined until a decision (48) to proceed is made the full dataset can be processed (46).

In the illustrated embodiment, both the keyword processing (41) and human intelligence task (42) workflows place attribute values or keyword components into a taxonomy improvement queue. The determination of whether the keyword component or attribute value is relevant, a synonym of an existing category name or attribute value, a new value for an existing category or attribute, or an entirely new attribute or category can be a human intelligence task performed by an editor or by turks and/or involve an automated process. In several embodiments, new categories, attributes and keyword components are placed in a taxonomy improvement queue (49) and automated processes and/or human intelligence tasks are performed to determine whether an addition should be made to the taxonomy. The workflows illustrated in FIG. 3 continue until all of the source data is processed and all of the keyword components and attribute values are cleared from the taxonomy improvement queue or until a sufficiently high keyword space coverage is achieved. Keyword space coverage can be measured as the percentage of input keywords, in many embodiments weighted by search volume, that can be mapped to a concept defined by the taxonomy. Once a predetermined target keyword space coverage is achieved, the taxonomy can be utilized to build a targeted search campaign in accordance with embodiments of the invention.

Although a specific process is illustrated in FIG. 3, any of a variety of fully automated, manual, or hybrid processes that map data from a set of source data to attribute values within a taxonomy can be utilized into the building of a taxonomy in accordance with embodiments of the invention.

Building a Targeted Search Campaign Using a Taxonomy

The process of building a targeted search campaign in accordance with embodiments of the invention involves predicting relevant keywords and then using relevant keywords to identify targets for the advertising campaign using the taxonomy. The identified targets are mapped to one or more relevant landing pages and creatives. Processes for identifying targets, generating creatives, and building targeted search campaigns using taxonomies in accordance with embodiments of the invention are discussed further below.

Associating Keywords with Targets

A keyword space is a theoretical space containing all potentially relevant keywords identified in terms of a set of category and/or attribute values. Campaigns in accordance with many embodiments of the invention identify targets for the targeted search campaign based upon keywords in a keyword space. In many embodiments, identifying targets involves selecting a subset of keywords in the keyword space that are believed to be useful, relevant keywords. The process of selecting keywords can involve mapping known "good" keywords to concepts and/or generating/predicting relevant keywords using known keyword components and grammar patterns. In several embodiments, the process of identifying targets involves defining concepts representing unique combinations of categories and attribute values within the taxonomy, then using the combination of categories and attribute values to predict keywords relevant to the concept. In this way, relevant keywords can be predicted using the taxonomy and targets identified by combining these relevant keywords with other relevant targeting criteria.

Figure 4:
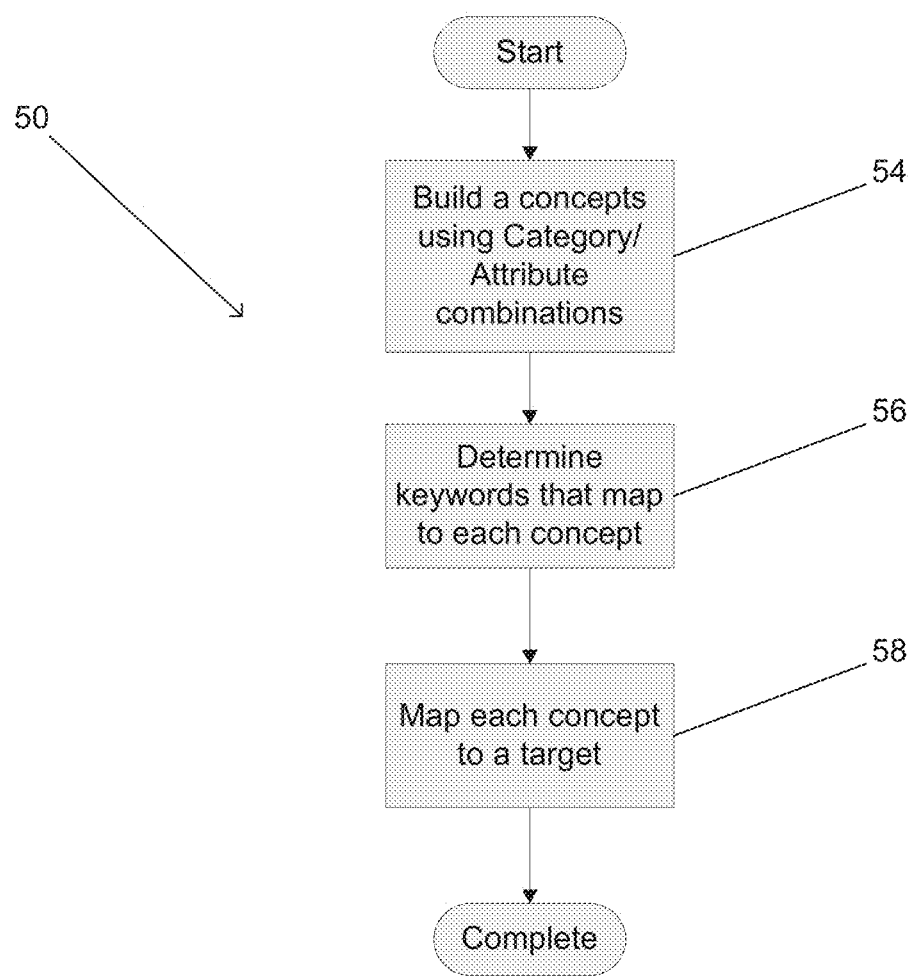
FIG. 4 is a flow chart illustrating a process for mapping keywords to concepts and identifying product and/or category landing pages to associate with the concepts in accordance with embodiments of the invention.

A process for identifying targets in accordance with an embodiment of the invention is illustrated in FIG. 4. When the landing pages have been taxonomized (see discussion above), the process 50 builds (54) "concepts" for unique combinations of category names and attribute values from the taxonomy. Concepts can generally be considered to reflect the meaning behind a specific search query. Once a set of concepts is defined using the taxonomy, a set of keywords that maps to each of the concepts is determined (56). In many embodiments, attributes associated with the concept can be determined by targeting criteria or attributes other than the search query, such as the user's geographic location, age, or gender. For example, the concept [Men's Shoes], represented by the attributes CATEGORY=Shoes, GENDER=Male, may be linked to the keyword "shoes" combined with the Male targeting criteria. Once the concepts and associated relevant keywords are determined, one or more targets can be generated for each concept using the keywords in combination with other relevant targeting criteria. The process 50 can also involves generating (58) one or more targets for each concept.

A target is a specific search query or set of search queries that are to be targeted by a specific advertisement in the targeted search campaign and can include any of a variety of attributes derived from the query itself, IP addresses, browser cookies, and/or a user profile associated with the user that provided the query. The extent to which a search query can be targeted is not limited to the keywords utilized in the search query. Additional information can also be derived from a search query. For example, information concerning where a user is in the purchase funnel can be derived from language in the query indicative of intent (e.g. "customer reviews for KEYWORD", or "price of KEYWORD"). Accordingly, the same keyword can be targeted in different ways depending upon intent. In many instances, the campaign may choose to avoid targeting a keyword where it is unlikely to lead to the acceptance of an offer (e.g. "KEYWORD repair" is not related to the sale of the KEYWORD). Additional information can also be indirectly derived from a query such as geographic location. The IP address of the device from which a search query originates can be used to identify the geographic location of the IP address. Accordingly, keywords can be targeted in different ways in different geographic locations (e.g. "KEYWORD" in IP Address maps to Santa Monica, Calif. vs. "KEYWORD" in IP Address maps to Glendale, Calif.). Accordingly, targets in accordance with embodiments of the invention can include any of a variety of attributes that can be derived from a search query, including but not limited to attributes derived from the query itself, IP addresses, browser cookies, and/or a user profile associated with the user that provided the query. The mapping of keywords to concepts, and the generation of targets using the concepts are discussed further below.

Generating Concepts Using the Taxonomy

Concepts can be generated using unique combinations of category names and attribute values from a taxonomy. For example, the category "Bar Stools" and the attribute key value "Material: Wood" form the concept "Wood Bar Stools". A concept can be generated for every possible combination of category name and attribute value. In many embodiments, however, concepts are limited to a specified number of attributes. In several embodiments, intent can also be incorporated into the identified concepts. Such concepts can be referred to as intent concepts. The intent captured in the intent concept reflects the intention of users searching for the concept. As is discussed further below, intent concepts can be utilized to better target presentation of offers to users.

Many different concepts generated using category names and attribute values can have the same meaning. In a number of embodiments, concepts obtained by building unique combinations of category name and attribute values from the taxonomy are regarded as "surface concepts". Often surface concepts, although unique, refer to the same thing or are synonymous. For example, the surface concepts "ps 2" and "Sony Playstation 2 Video Game Console" actually refer to the same video game console. One surface concept includes MODEL and VERSION, whereas the other has BRAND, MODEL, VERSION, AND CATEGORY. The video game console to which both surface concepts refer can be considered a "deep concept". A deep concept is a single canonical concept and typically includes all of the category name and attribute values that can be used to describe the concept. Stated another way, the deep concept holds all of the attributes of the concept and so describes the concept at its most granular.

When the distinction is made between surface and deep concepts, keywords are mapped to deep concepts as opposed to surface concepts. Use of deep concepts can simplify the construction of a campaign by combining all keywords with the same meaning into a single adgroup. In addition, deep concepts hold all of the information related to a concept and enable more complete mappings of surface concepts to offers. In many embodiments, the process of mapping deep concepts to surface concepts is relatively straightforward. The deep concept includes more attributes than the surface concept and the attributes of the surface concept map to a single deep concept. Where the attributes map to multiple deep concepts, then a disambiguation process can be used that can be a human intelligence task and/or include an automated process. Disambiguation processes that can be utilized to disambiguate the mapping of phrases to concepts in accordance with embodiments of the invention are discussed further below. The attributes of the deep concept can be useful in understanding how a surface concept relates to other concepts. For example, systems in accordance with embodiments of the invention can easily calculate that [CITY=Los Angeles, STATE=California] is subordinate to [STATE=California]. A concept is subordinate to another concept when the subordinate concept is included within or is a subset of the other concept. However, the system may not know that the surface concept [CITY=Los Angeles] is subordinate to [STATE=California]. However, if [CITY=Los Angeles] is first mapped to deep concept [CITY=Los Angeles, STATE=California], then the system can establish the relationship between the two surface concepts. Where attribute values are stored in a hierarchy, systems in accordance with embodiments of the invention can use the hierarchy to map surface concepts to deep concepts. A thesaurus can also be used to map surface concepts to a deep concept as can transformation rules that specify how a concept following a specific pattern (including but not limited to a grammar pattern) should map to a deep concept.

An inference engine may also be used to infer additional attributes from the attributes of the surface concept. In many embodiments, the set of all attributes inferred from the surface concept can be added to the attributes of the surface concept to obtain the deep concept. In this way, the deep concept can hold all of the attributes related to a concept. Once a set of deep concepts have been established, then the manner in which potentially relevant keywords map to the deep concepts can be determined in accordance with embodiments of the invention.

Mapping Keywords to Concepts

In many embodiments, the set of keywords that map to a concept is generated using all possible combinations of the synonymous keyword components within the taxonomy that are associated with the category names and attribute values that form the basis of the concept. For example, if the concept is "Wood Bar Stools" and the taxonomy associates the synonymous keyword concepts "bar stools", "barstool", "barstools", and "bar stool" with the "Bar Stools" category and the synonymous keyword concepts "wood", and "wooden" for the "Wood" attribute then the keywords that map to the concept are "wood bar stools", "wooden bar stools", "wood barstool", "wooden barstool", "wood barstools", "wooden barstools", "wood bar stool", and "wooden bar stool".

The combination of keyword concepts used in the above example can also yield the keywords "bar stools wood" etc., which are unlikely to be used in search queries. In many embodiments, therefore, the generation of a set of keywords that map to a concept also considers grammar patterns. Grammar patterns can be defined that specify the order in which category names and attribute values are combined. In many embodiments, the grammar patters include both a grammar component and a semantic component. Accordingly, the grammar patterns specify how specific keyword components can be used in specific contexts. In this way, combinations of grammar patterns are utilized to generate keywords. The combination of grammar patterns involves combining the semantic components of the grammar patterns in accordance with the associated keyword components. For example, in a video game taxonomy grammar patterns can be derived such as 'VIDEOGAME_RELEASE game', 'modern warfare CATEGORY' and 'video game'. These grammar patterns identify that the keyword component 'game' can be modified by VIDEOGAME_RELEASE, but can't necessarily stand alone as a keyword. The 'video game' keyword component, however, can stand alone as a keyword. And the keyword component 'modern warfare' can modify CATEGORY. These grammar patterns can be utilized to produce keywords as follows: 'VIDEOGAME_RELEASE game'+'modern warfare CATEGORY' produces 'modern warfare game', where 'modern warfare' is a value of the VIDEOGAME_RELEASE attribute and 'game' is a CATEGORY name. Keyword produced in this way are associated with their semantic components (VIDEOGAME_RELEASE and CATEGORY in the above example), and can thereby be distinguished from keywords that are identical but have different semantic components (ambiguous keywords or homographs). This allows ambiguous keywords or to be treated as different keywords.

In other embodiments, simpler grammar patterns that do not incorporate semantic content can be utilized that specify the ordering of roots and modifiers, and any static text that should go before, after, or in between attributes. A root is a keyword concept synonymous with a category name. A modifier is a keyword concept synonymous with an attribute value. In the example of the "Wood Bar Stools" concept described above, the specified grammar pattern is MATERIAL CATEGORY. In many embodiments, specific grammar patterns are associated with specific categories (e.g. MATERIAL CATEGORY: "Bar Stool").

As is discussed below, the incorporation of semantic components into grammar patterns can significantly decrease the need to disambiguate keywords generated using the grammar patterns. The same keyword components and grammar patterns used to generate keywords associated with a particular concept can also be used to generate dynamic display names for use in creatives (see discussion below).

In many embodiments, the search volume and frequency of a grammar pattern and the keyword components combined using the grammar pattern can be used to help predict the likely search volume or frequency of keywords generated using the grammar pattern. The most frequent keywords can be those chosen for use in the targeted search campaign. When generating keywords, predicting search frequency based upon the search frequency of the keyword components and grammar patterns can be used to filter the generated keywords to predict the generated keywords that are most likely relevant to the targeted search campaign.

When mapping keywords to concepts, ambiguity can exist due to a single keyword mapping to multiple concepts. Incorporation of semantic components into grammar patterns can significantly reduce the need to perform disambiguation. In addition, use of machine learning to identify additional grammar patterns (including negative or incorrect grammar patterns) can further reduce the need for performing separate disambiguation processes. When ambiguity is present, a disambiguation process can be utilized to select the concept with which to associate a keyword. In many instances, probabilities can be assigned to each possible interpretation. In a number of embodiments, each possible interpretation is weighted based upon its estimated search volume. In many embodiments, the search volume estimate is based on the known search volume of the grammar patterns that make up the keyword, including the semantic components of those grammar patterns (such that two keywords with the same spelling but different semantic components—homographs—may have different scores). In several embodiments, disambiguation is a human intelligence task and/or involves automated processes. In many embodiments, blacklists are maintained to prevent specific ambiguous keywords from being associated with specific concepts.

Although specific processes for generating keywords using keyword components synonymous with the category name and attribute values included in a concept are discussed above, any manual or automatic process for mapping keywords to concepts that is appropriate to a specific application can be utilized in accordance with embodiments of the invention.

Deriving Grammar Patterns

Grammar patterns can be derived from unparsed keywords with volume/value data that have unambiguous parsings. In addition, a machine learning system can derive additional grammar patterns and negative grammar patterns from a training data set including ambiguous parsings and the correct mappings for those keyword components and incorrect mappings for those keyword components. As the database of grammar patterns grows, the system is able to correctly parse more keywords from the known list of keywords. The system can then extract additional grammar patterns from these correct parsings, allowing it to correctly parse even more keywords. In this way, the ability of the system to correctly parse keywords and to generate relevant keywords using keyword components and grammar patterns associated with specific concepts can improve over time.

Generating Targets

Target concepts are typically defined in terms of the commercial intent of a search query or an intent concept. A target may include a keyword in addition to any targeting criteria associated with a search query. A simple target can be a keyword that has been generated for a target concept or more specifically a deep concept. More complex targets can include search query attributes indicative of a consumer's geographic location, age, gender, or other characteristics that may be of interest to a marketer and/or connected to the target concept or consumer intent. In many embodiments, additional attributes of a search query can be targeted including but not limited to information derived from a user's IP address, a cookie within the browser application used to submit a query, and/or a user profile. In many embodiments, these additional attributes may be selected using an inference engine that selects those attributes of a search query that are likely to be present for consumers with intent indicated in the given intent concept. For example, a target concept may include attributes CATEGORY=Shoes and GENDER=Male. A target may be generated for this target concept that includes all search queries for the keyword "shoes" made by men. Or, it may include all search queries for the keyword "men's shoes". The extent to which additional attributes are included in the selection of targets is often determined based upon the requirements of a specific application.

Targeting Offer Concepts

An offer concept defines the attributes of an offer that is presented to a user in response to a targeted search query. As is discussed further below, the attributes of an offer concept are not necessarily the same as the attributes of the concept used to generate a target (i.e. the target concept). Whereas a target concept describes what a user is searching for, an offer concept describes what the website(s) that are the focus of the paid search advertising campaign can offer the user. In many embodiments, a campaign creation system attempts to match the offers (i.e. the offer concepts) that are likely to yield the best outcome (e.g. click throughs, conversions, revenue) with respect to a specific target. Once an offer concept is matched to a target, the attributes of the targeted offer concept can be utilized to select a landing page and to generate creatives that can be used to present the offer to a user in response to a targeted search query.

A target concept does not necessarily correspond to an offer concept (i.e. a set of attributes presented in an advertisement). The offer concept is expressed as a combination of actual offer attributes (e.g. "LCD TVs"). Although the target concept is often also just a combination of attributes, it might contain attributes that aren't an actual part of the offer. For example, (e.g. "Comparison LCD and Plasma TVs"). In many instances, the advertiser's landing pages may not include a "comparison". The advertiser offers TVs, or LCD TVs, or Plasma TVs. So the target concept is mapped to one of these offer concepts. In general, once a target concept has been unambiguously mapped to a deep concept, it is mapped to an offer concept as part of the process of determining relevant ads and landing pages. There could be various rules for making this mapping, such as choosing one of the 2 concepts being compared as the offer concept, or choosing the most common ancestor (e.g. televisions).

Another example of target to offer concept mapping is mapping the concept:
"Dentists Near Santa Monica", which is defined using the attributes OFFER TYPE=Small Business/Dentists and NEAR LOCATION=California/Los Angeles/Santa Monica
to the offer concept
"Dentists in Venice Beach", which is defined using the attributes OFFER TYPE=Small Business/Dentists NEAR LOCATION=California/Los Angeles/Venice Beach)

Such a mapping can make use of a "fact base" containing information such as the fact that Venice Beach is near Santa Monica. Although specific processes are outlined above for determining relevant landing pages for specific targets including processes that involve mapping target concepts to offer concepts, any of a variety of processes can be utilized to identify one or more relevant landing pages for a specific target in accordance with embodiments of the invention.

In many embodiments, one or more offer concepts are mapped to a target concept based upon the target concept and offer concept combination that is likely to maximize or improve a predetermined metric such as (but not limited to) click throughs, conversions, and/or revenue. In a number of embodiments, a machine learning process is used to map offer concepts to the intent concepts underlying a specific target. Appropriate machine learning processes include (but are not limited to) a process based upon a Gaussian Art Map, Group Lasso, decision trees or any other appropriate machine learning technique that can utilize semantic metadata or features (i.e. semantic information describing a concept within the taxonomy) to estimate performance of mapping a specific target to a specific offer concept. In several embodiments, a campaign creation server system used to build and deploy a campaign tracks metrics concerning the performance of the campaign including (but limited to) total impressions, click throughs, conversion and revenue for each intent concept and offer concept combination. This information can be utilized to generate reports and analytics concerning that attributes that have the most influence on the performance of different intent attributes. The aggregated performance data is also used in the manner described above to select specific intent concept and offer concept combinations that will improve the performance of the overall campaign.

In several embodiments, offer concepts that are matched to a target are constrained to offer concepts corresponding to products that are part of the advertiser's inventory of products and services. In many embodiments, this inventory is the set of products and/or services represented on the landing pages in the advertisers web site. In many embodiments, this inventory is determined from additional source data obtained about the advertiser's products and services, for example from the advertiser's product catalog. In several embodiments, this inventory may additionally be determined from the content of the creative and keywords in the advertisers existing search advertising campaign. In many embodiments, offer concepts are selected based upon custom rules selected by the marketer conducting the targeted search advertising campaign. For example, a marketer might direct a campaign creation server system to offer the top selling product when the customer has brand intent, which translates to selecting the best intent concept/offer concept combination where the intent concept includes the BRAND attribute and the offer concept includes the PRODUCT attribute.

Mapping Targeted Offer Concepts to Landing Pages

The creation of a targeted search campaign involves specifying targets, identifying one or more offers that are relevant to the targets (i.e. the targeted offer concepts) and generating creatives and selecting landing pages based upon the attributes of the offers. For each offer, there may be multiple relevant landing pages and a mapping between targets and landing pages can be made using the attributes of the offer concept targeted by a specific target. In a number of embodiments, the landing pages that are mapped to a specific target are determined based upon precision and recall with respect to the targeted offer concept. The precision of a landing page can be determined based upon the number of products represented on the landing page that are subordinate to the targeted offer concept as a percentage of the total number of products represented on the landing page. The recall of a landing page with respect to a targeted offer concept is the number of products represented on the landing page that are subordinate to the targeted offer concept as a percentage of the total number of products in the advertiser's inventory (i.e. products that appear on any landing page) that are subordinate to the offer. Based upon the precision and recall of specific landing pages to a targeted offer concept, a match can be determined. In many embodiments, the landing page matched to a specific target can be determined based upon a target concept (i.e. the concept indicating the intent of the search query). In several embodiments, a featured offer page can also be selected where present. In many embodiments, page scoring can be performed based upon customer rating and/or price with the product landing page with the highest customer rating selected and the highest price offer acting as a the breaker between product landing pages featuring similar customer ratings. As is discussed further below, a number of landing pages can be utilized when building creatives based on a targeted offer concept and the system can test each of the landing pages and determine which is the most effective for specific targets. If there is no closely or matching landing page, then the concept can be ignored or placed in a low-quality group.

Generation of Dynamic Display Names

Dynamic display names can be generated for each targeted offer concept and the dynamic display names can be utilized in the generation of creatives that are displayed in response to a query matching the relevant target. In a number of embodiments, the generation of dynamic display names is similar to the process described above for generating a set of keywords for a specific concept. The difference, however, is that instead of generating a set of keywords the process is used to generate a single phrase. In a number of embodiments, the phrase is selected to be the shortest or most common form of the phrase. In several embodiments, the grammar pattern, and keyword components that have either the highest search volume or the most impressions, or that have appeared in creatives that received the most clicks or conversions, are used to generate the dynamic display name for an offer concept. In other embodiments, any of a variety of techniques appropriate to a specific application can be utilized to generate a dynamic display name in accordance with embodiments of the invention.

Campaign Building

When keywords have been mapped to concepts, concepts have been used to generate targets, one or more relevant offer concepts have been identified for each target concept, and one or more relevant landing pages have been identified for each offer concept, using a process similar to the processes outlined above, a targeted search advertising campaign in accordance with embodiments of the invention can be built. The process of building the campaign involves creating adgroups, which are lists of keywords and creatives with associated settings, such as but not limited to the match type, IP target, or other targeting attributes of the ad group. These adgroups then form the basis of a targeted search campaign that can be uploaded to a search engine provider. The search engine provider uses the adgroups to define the creatives to display when a search query is received that matches one of the keywords within the adgroup in accordance with the match type specified in the adgroup. Processes for building adgroups in accordance with embodiments of the invention are discussed further below.

Building Adgroups

In many embodiments, an adgroup is generated for each target concept. As noted above, an offer concept is typically matched to each target concept to translate the intent of the query into an offer that can be presented by the website(s) that is the focus of the targeted search advertising campaign. Creatives can be generated using the attributes of the targeted offer concept and one or more relevant landing pages having different degrees of specificity can be identified using the targeted offer concept. In many embodiments, a separate adgroup is generated for each landing page that is associated with each target concept (one ad group per target concept/landing page combination). The targets included in each adgroup are derived from the keywords associated with the target concept that is the basis of the adgroup. For each ad group, at least one creative and landing page combination is defined along with the match type of the keyword. As is discussed further below, more than one creative and landing page combination may be defined for each keyword to accommodate targeting of the advertising based upon such characteristics as geographic location. In a number of embodiments, a set of creatives is created using the attributes of the targeted offer concept and the performance of the different creatives with respect to each target is tested and used to refine the selection of the specific creative to display with respect to a specific target. In many embodiments, however, the traffic for a number of the keywords is too low to extract meaningful data concerning the performance of different creatives. Therefore, the creatives that are displayed in relation to specific keywords is defined during the building of the campaign and modified based upon analysis of the performance of the campaign. When adgroups have been generated with respect to all of the target concepts within the taxonomy, the adgroups can be converted into bulk sheets that can be uploaded to one or more search engine providers to commence the targeted search campaign.

Building Adgroups Using Templates

Figure 5:
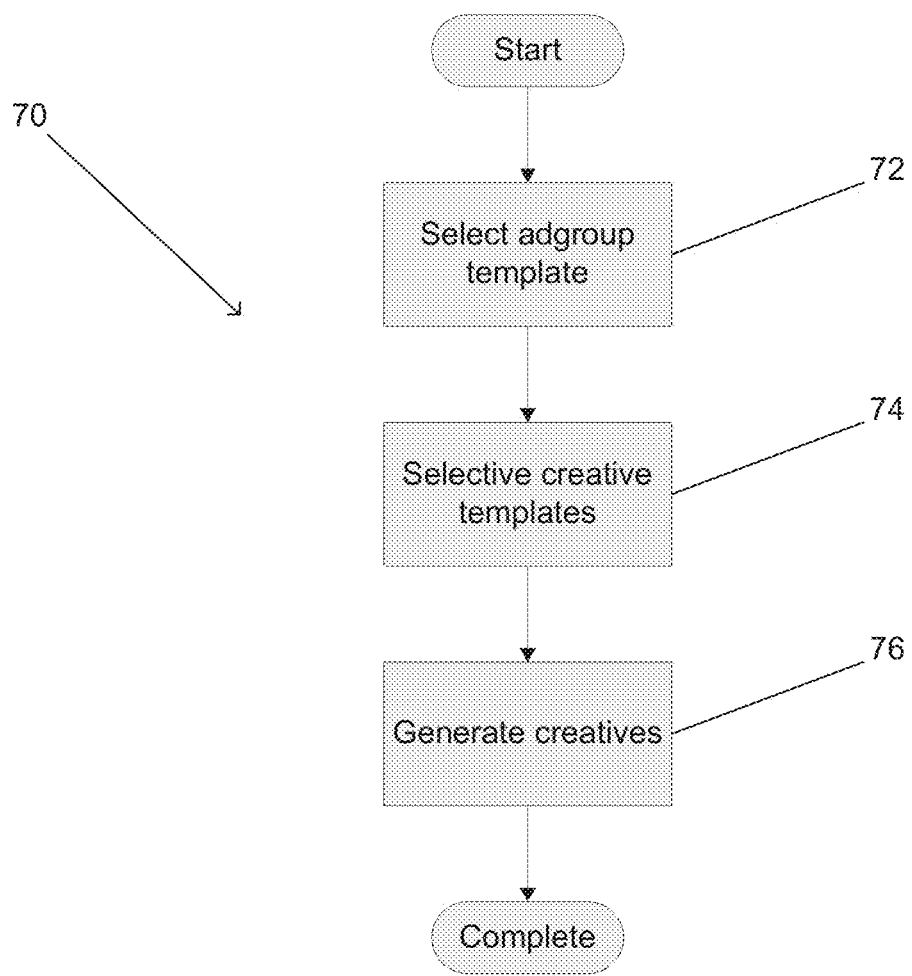
FIG. 5 illustrates a process for generating keyword, landing page, creative, and match type combinations for specific keywords within an adgroup in accordance with embodiments of the invention.

Adgroups and creatives can be constructed using templates. A process for generating an adgroup using adgroup and creative templates in accordance with an embodiment of the invention is illustrated in FIG. 5. The process 70 commences by selecting (72) an adgroup template for the adgroup. In several embodiments, the adgroup template is determined based upon the type of landing page. For example, a different adgroup template can be used depending upon whether the adgroup links to a product landing page or a category landing page. The difference in the adgroup templates may be as minor as specifying different URLs to display. In many embodiments, the adgroup template is selected based on the offer concept and the attributes present in the offer concept. However, different adgroup templates typically include different creative templates. Once an adgroup template has been selected, creative templates are selected (74) and used to generate creatives based upon the attributes of a targeted offer concept. A set of creative templates is defined for each ad group template. In several embodiments, the first creative template that fits (i.e. satisfies formatting requirements for the creative imposed by search engine providers) is selected and used to generate (76) a creative using the attributes of a targeted offer concept.

Figure 6:
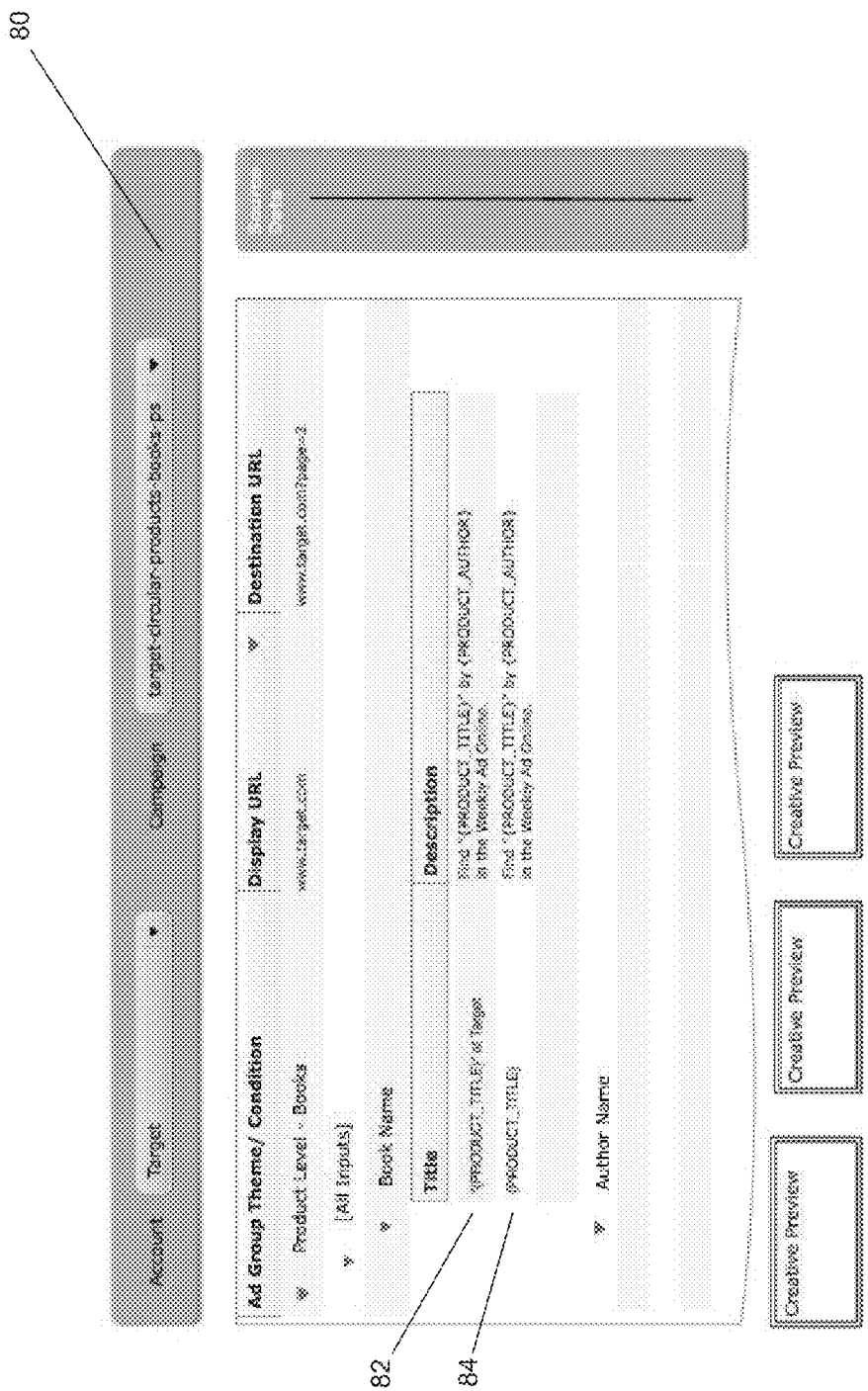
FIG. 6 is a conceptual illustration of a user interface illustrating creatives templates that can be used to generate creatives for inclusion in an adgroup in accordance with an embodiment of the invention.
Figure 7:
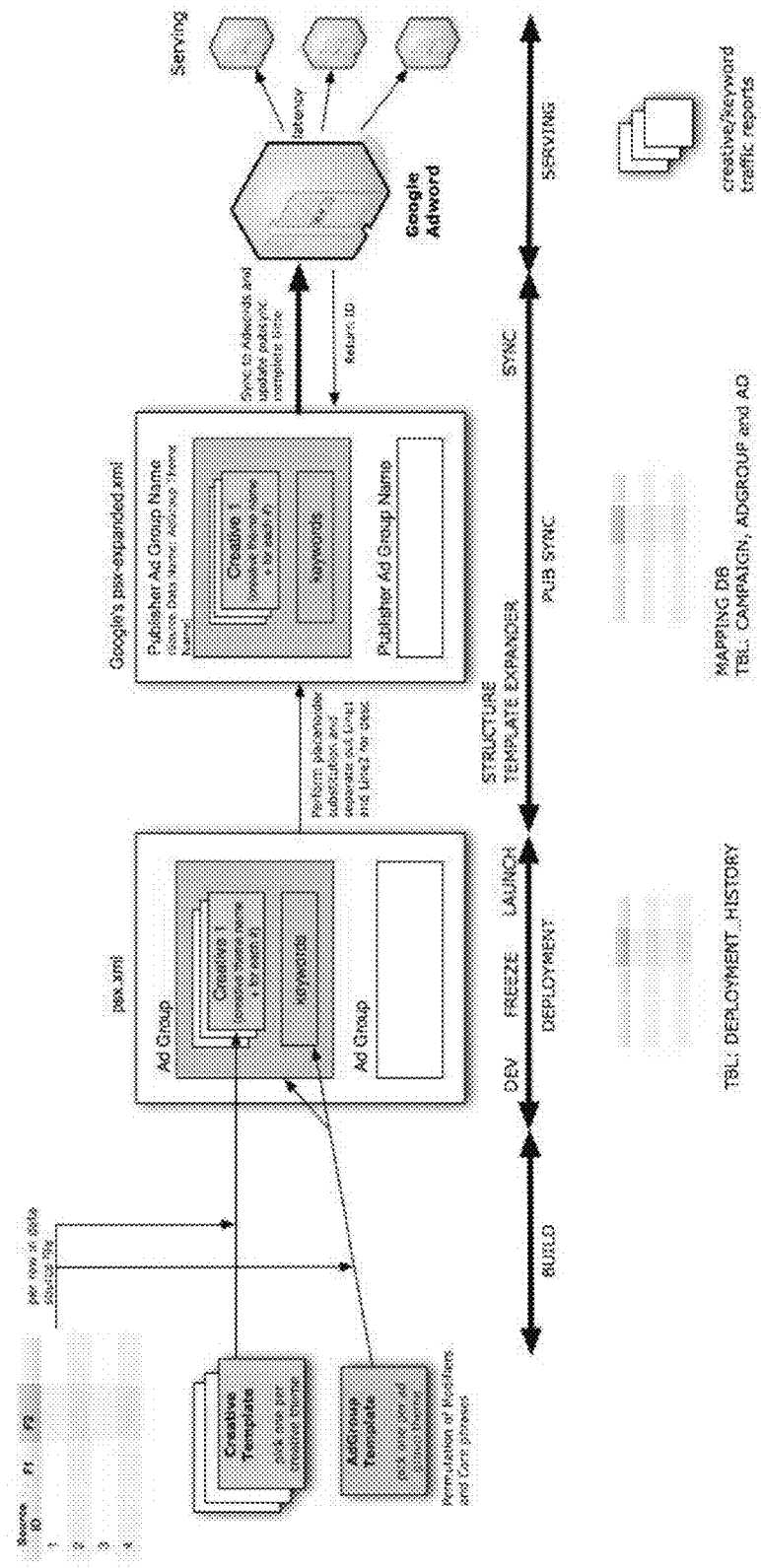
FIG. 7 is a flow diagram conceptually illustrating the creation of a targeted search campaign using adgroup templates and creative templates in accordance with embodiments of the invention.

A user interface used to edit creative templates in accordance with embodiments of the invention is illustrated in FIG. 6. In the illustrated embodiment, the user interface 80 indicates that a single adgroup template exists (i.e. irrespective of the inputs in the adgroup template, the same creative templates are utilized to generate creatives) and a list of creative templates are provided based upon the attribute values present in the offer concept. If the "Book Name" attribute value is present in the offer concept, then the first creative template that fits the formatting requirements of the search engine provider is selected. Otherwise, creative templates defined for other attribute values are tested. In the illustrated embodiment, the creative is generated by inserting the relevant attribute values associated with the offer concept that forms the basis of the adgroup into the template. The first creative template 82 includes the static text "at Target" in the title of the creative. If the number of characters of the title is too long after substituting the PRODUCT_TITLE attribute of the offer concept into the creative, then the second creative template 84 does not include the "at Target" static text to reduce the length of the title. In many embodiments, the creative template may include a placeholder for the display form of the offer concept described above. In many embodiments, the creative template may be generated automatically by the system from examples of human-written creatives associated with offers, by replacing attributes of the offer found in the creative with a placeholder for the attribute name. For example, if a creative associated with an offer containing attributes CATEGORY=Televisions and SCREEN_TYPE=LCD contains the text "Deals on LCD TVs", then this text can be converted to the template "Deals on {SCREEN_TYPE} {CATEGORY}". Using templates in the manner outlined above, a creative can be generated for each adgroup. A process for generating adgroups and uploading a bulk sheet to the Google search engine provided by Google, Inc. is illustrated in FIG. 7. Although the use of adgroup templates and creative templates is described above with respect to the generation of creatives for a specific adgroup, in many embodiments other techniques appropriate to specific applications can be used to generate creatives for inclusion in adgroups in accordance with embodiments of the invention. In other embodiments, any of a variety of techniques can be utilized to provide the details of a targeted search advertising campaign to a search engine provider in accordance with embodiments of the invention.

Generation of Creatives Using Advertising Strategies

Another approach for generating creatives for inclusion in adgroups in accordance with embodiments of the invention is to define "strategies" for selecting creative templates. A strategy associates a target with a specific landing page and a specific set of creative templates. For example, a strategy could associate any targets within a geographic area searching for reviews of televisions with a featured offer landing page for the highest rated television, and a creative theme that shows a rating. Due to the fact that the strategy associates both a landing page and a creative with a specific target, both the landing page and the creative can be optimized over time to improve the performance of the strategy.

Selection of Adgroup Match Type

The selection of a broad match type for an ad group can result in the keywords submitted to the search engine operator, sometimes referred to as the bidded keywords, matching many different actual user queries. As a result, specific search queries may "match" different bidded keywords, in which case the creative and landing page combination that is displayed within the search results is left to the search engine provider to decide.

When the set of user queries matched by two different targets overlap, then it can be said that one target is "stealing" traffic from another. In conventional search advertising campaigns, targets can steal a significant volume of traffic from each other unless very restrictive match types are used. The segment of traffic that is captured by a specific target can be defined as all user queries that match the target less the user queries that are stolen by overlapping targets. When viewed in this way, the segment of traffic matched by a target is determined not only by the target itself, but other targets that are currently active in the ad campaign.

Understanding the segment of traffic captured by a target is further complicated by the fact that bids and quality scores for different creative/landing page combinations change over time. Therefore, when optimizing an advertising campaign (see discussion below) smaller changes are typically performed so that the changes do not significantly alter the traffic segments for the targets. In many embodiments, the goal of the optimization is to filter targets that are not driving traffic to the website or group of websites targeted by the campaign or that are driving traffic that is unlikely to accept the presented offer and to modify the selection of creative and landing pages to improve the performance of the campaign (i.e. acceptance of offers) with respect to the targets that are effective in driving traffic to landing pages. The optimization process can be complicated by the statistically small number of samples that may exist with respect to specific targets. Therefore, the optimization processes can be improved by grouping samples for targets based upon common attributes of targets, such as (but not limited to) targets that include the same brand, product type, IP location, or any combination of these attributes keywords that map to the same concept. Multivariate testing can then be applied to help make decisions concerning targets to try as the campaign progresses. In addition, the most effective targets, and the most effective advertisement/landing page combination for each target are likely to change over time. Therefore, continued modification of the campaign can be important to sustaining the performance of a campaign.

Keyword Discovery Using Controlled Expansion of Match Types

When a match type for a particular keyword is broadened, the keywords that are determined to match a target within a paid search campaign can include previously unknown keywords. In a number of embodiments, keywords that are "discovered" in this way can be used to improve the taxonomy and the performance of the overall campaign. In many embodiments, the match type of a specific keyword is broadened and a number of new keywords are discovered. These keywords can be used to refine the taxonomy. New creative and landing page combinations can be defined for targets that include the newly discovered keywords and narrower match types can be utilized for the original target and the new targets to further refine the performance of the campaign.

Campaign Optimization

In a number of embodiments, a campaign built using processes similar to those described above is deployed in combination with an existing campaign. In many instances, a marketer with domain expertise will have highly optimized certain keyword, creative, and landing page combinations. By deploying a hybrid campaign, these highly optimized keywords, creatives, and landing page assignments can be incorporated into a targeted search advertising campaign generated using a taxonomy. Over time, the performance of the overall campaign can then be improved using any of a number of optimization techniques including but not limited to multivariate testing to determine alternative creatives and/or landing pages to try with the non-optimized keywords.

System Architecture

Figure 8:
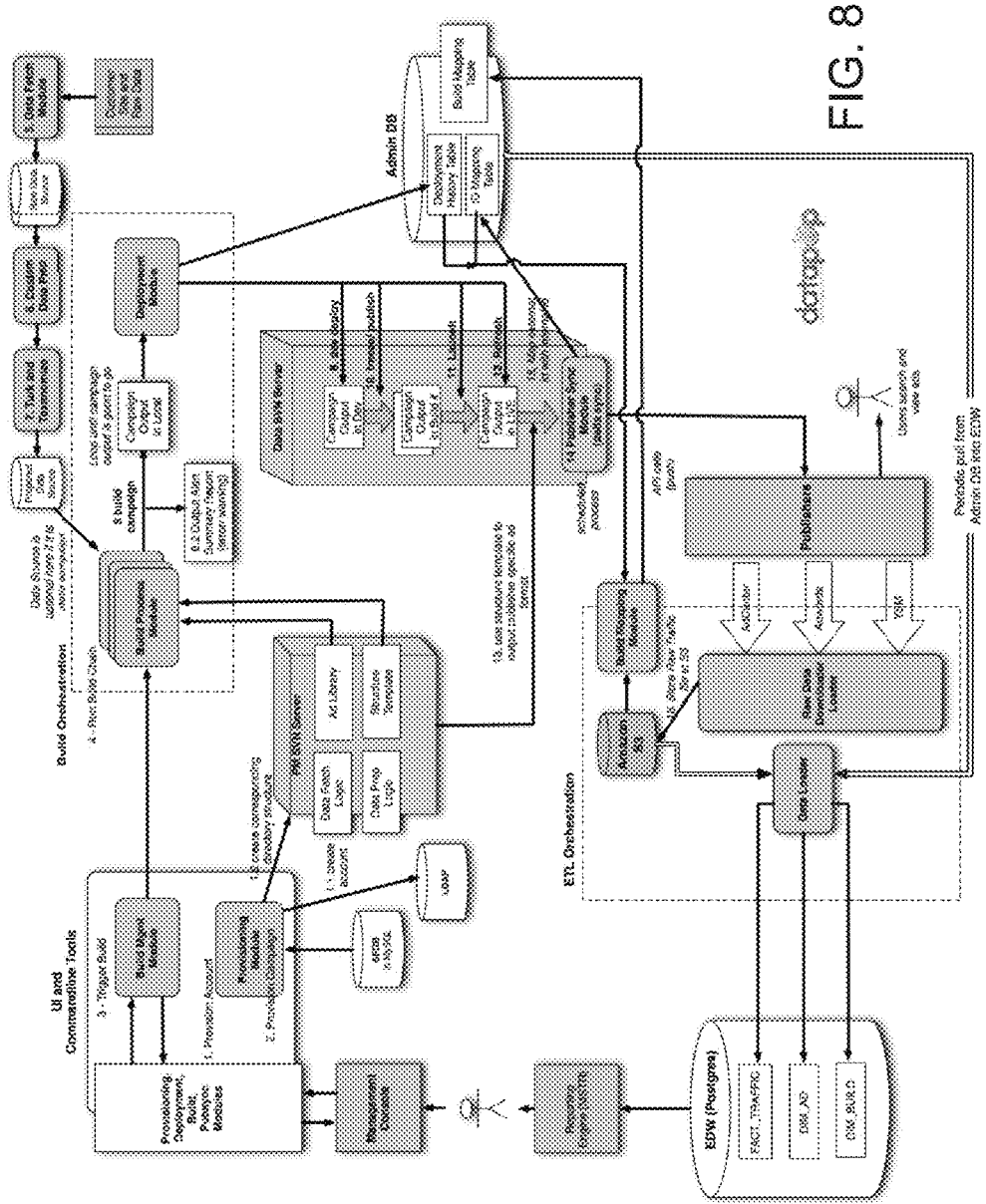
FIG. 8 is an architecture diagram of a system for building a targeted search advertising campaign using a taxonomy in accordance with an embodiment of the invention.

As can be readily appreciated, any of a variety of architectures can be used to implement a system for building a targeted search campaign using a taxonomy in accordance with embodiments of the invention. In many embodiments, a campaign creation server system is provided that comprises one or more servers configured via software to perform processes similar to those outlined above. In several embodiments, the campaign creation server system also includes databases and/or warehouses to store source data, taxonomies generated using source data, and campaigns built using the taxonomy. A specific architecture constituting a campaign creation server system in accordance with an embodiment of the invention is illustrated in FIG. 8. Although a specific architecture is illustrated in FIG. 8, any of a variety of alternative architectures appropriate to a specific application can also be utilized in accordance with embodiments of the invention including locally and remotely hosted campaign creation systems and systems that integrated with a search engine paid search advertising system.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A method of automatically generating targeting information for a plurality of landing pages, comprising:

obtaining source data describing a plurality of landing pages using a campaign creation server system, where the landing pages include information describing a set of offers;

obtaining a list of initial keywords using the campaign creation server system, where the keywords in the initial list of keywords comprise keyword components;

building a taxonomy based on the source data and the initial list of keywords using the campaign creation server system, where the taxonomy uniquely maps the plurality of landing pages to categories and attributes and also maps the keyword components to the categories and attributes;

specifying target concepts based on combinations of keyword components from the initial keywords using the campaign creation server system, where each target concept has a specific set of categories and attributes within the taxonomy defined based upon the different categories and attributes of the keyword components that are combined to form the target concept;

identifying a plurality of offer concepts based on the information describing the plurality of offers using the campaign creation server system, where each offer concept is a specific set of categories and attributes within the taxonomy identified using the information describing the offer in the source data describing the plurality of landing pages;

matching target concepts to relevant offer concepts within the plurality of offer concepts based on the specific sets of categories and attributes within the taxonomy of the target and offer concepts using the campaign creation server system; and once a specific offer concept is matched as relevant to a specific target concept, identifying targeting information for one or more of the plurality of landing pages based on the attributes within the taxonomy of the specific target concept that matches the relevant offer concept for the landing page using the campaign creation server system.

2. The method of claim 1, wherein the categories are arranged as a hierarchy of categories with associated attributes.

3. The method of claim 1, wherein the taxonomy supports recursive definition of a first category as an attribute of a second category.

4. The method of claim 1, wherein:
each category is identified using a category name; and
each attribute is specified as a key value pair.

5. The method of claim 4, wherein the taxonomy includes a set of category names and attribute values that describe products that are the subject of offers within the plurality of landing pages.

6. The method of claim 5, wherein each product described within a landing page is identified using a unique identifier that is derived from at least one attribute value that describes the product.

7. The method of claim 4, wherein matching target concepts to relevant offer concepts comprises:
identifying concepts representing unique combinations of category names and attribute values within the taxonomy using the campaign creation server system; and
predicting keywords that are relevant to the identified concepts using the campaign creation server system.

8. The method of claim 7, wherein:
identifying concepts representing unique combinations of category names and attribute values comprises:
identifying surface concepts using unique combinations of category names and attribute values; and
identifying deep concepts to which at least one surface concept is subordinate; and
predicting keywords that are relevant to the identified concepts comprises predicting keywords that are relevant to the identified deep concepts.

9. The method of claim 8, further comprising inferring additional attributes of a surface concept using an inference engine.

10. The method of claim 7, wherein predicting keywords that are relevant to the identified concepts further comprises generating a set of keywords using keyword components within the taxonomy that are associated with the category name and attribute values that form the basis of the concept.

11. The method of claim 10, wherein generating a set of keywords using keyword components within the taxonomy that are associated with the category name and attribute values that form the basis of the concept further comprises generating keywords using the keyword components based upon grammar patterns.

12. The method of claim 11, wherein the grammar patterns are associated with specific category names within the taxonomy.

13. The method of claim 12, wherein at least one of the grammar patterns include a grammar component and a semantic component.

14. The method of claim 13, wherein at least one keyword is generated by combining the semantic components of a plurality of grammar patterns in accordance with the grammar components of the grammar patterns.

15. The method of claim 10, wherein predicting keywords that are relevant to the identified concepts further comprises:
estimating keyword search volume using search volumes associated with the grammar patterns and keyword components used to generate the keyword; and
filtering keywords for relevancy to an identified concept based upon the estimated keyword search volume.

16. The method of claim 7, wherein matching target concepts to relevant offer concepts further comprises identifying at least one target based on a keyword predicted to be relevant to a target concept.

17. The method of claim 16, wherein matching target concepts to relevant offer concepts further comprises identifying at least one targeting criteria for the at least one target, where the at least one targeting criteria is selected from the group consisting of keyword match type, intent, geographic location, profile information, language, and information derived from a cookie contained within a browser application from which the search query originated.

18. The method of claim 17, wherein matching target concepts to relevant offer concepts further comprises selecting an offer concept for a specific target based upon the estimated performance of the offer concept with respect to search queries targeted by the specific target.

19. The method of claim 1, further comprising:
automatically generating one or more anticipated creatives based on the specific sets of categories and attributes of the relevant offer concepts using the campaign creation server system;
automatically generating adgroups comprising at least one of the one or more anticipated creatives targeted towards the landing pages identified in the targeting information using the campaign creation server system; and
deploying the adgroups to a search engine provider using the campaign creation server system, where the search engine provider is configured to present one or more of the anticipated creatives from the uploaded adgroups in response to one or more search keywords received using the search engine provider.

20. The method of claim 1, wherein specifying target concepts further comprises:
generating additional keywords based on the keyword components and grammar rules using the campaign creation server system; and
utilizing the additional keywords when specifying the target concepts using the campaign creation server system.

21. The method of claim 20, wherein the generated additional keywords are not included in the list of initial keywords.

22. A method of automatically generating adgroups for use in a paid search advertising campaign to direct targeted users to a plurality of landing pages, comprising:
 obtaining source data describing a plurality of landing pages using a campaign creation server system, where the landing pages include information describing a set of offers;
 obtaining a list of initial keywords using the campaign creation server system, where the keywords in the initial list of keywords comprise keyword components;
 building a taxonomy based on the source data and the initial list of keywords using the campaign creation server system, where the taxonomy uniquely maps the plurality of landing pages to categories and attributes and maps the keyword components to the categories and attributes;
 specifying target concepts based on combinations of keyword components from the initial keywords using the campaign creation server system, where each target concept has a specific set of categories and attributes within the taxonomy defined based upon the different categories and attributes of the keyword components that are combined to form the target concept;
 identifying a plurality of offer concepts based on the information describing the plurality of offers using the campaign creation server system, where each offer concept is a specific set of categories and attributes within the taxonomy identified using the information describing the offer in the source data describing the plurality of landing pages;
 matching target concepts to relevant offer concepts within the plurality of offer concepts based on the specific sets of categories and attributes within the taxonomy of the target and offer concepts using the campaign creation server system by:
  identifying at least one surface concept within the taxonomy based on the target concepts and the relevant offer concepts using the campaign creation server system, where a surface concept in the at least one surface concept comprises keywords and attributes contained in at least one of the target concepts and at least one of the plurality of offer concepts;
  identifying at least one deep concept to which at least one surface concept is subordinate within the taxonomy using the campaign creation server system, where a deep concept comprises all of the category name and attribute values that can be used to describe the at least one target concept and the at least one offer concept; and
  predicting keywords that are relevant to the identified deep concepts, where the predicted keywords map the at least one target concept to the at least one offer concept;
 once a specific offer concept is matched as relevant to a specific target concept, identifying one or more of the plurality of landing pages that are relevant to the specific target concept based on the attributes within the taxonomy of the specific relevant offer concept using the campaign creation server system;
 automatically generating one or more anticipated creatives based on the specific sets of categories and attributes of the relevant offer concepts using the campaign creation server system;
 automatically generating adgroups comprising:
  at least one of the one or more anticipated creatives targeted toward at least one keyword identified based on the specific target concept matched to the specific relevant offer concept used to generate the anticipated creative; and
  at least one of the landing pages identified as relevant to the specific target concept based on the attributes in the taxonomy of the specific relevant offer concept; and
 deploying the adgroups to a search engine provider using the campaign creation server system, where the search engine provider is configured to present one or more of the anticipated creatives from the uploaded adgroups in response to one or more search keywords received using the search engine provider.

23. The method of claim 19, wherein automatically generating one or more anticipated creatives based on the specific sets of categories and attributes of the relevant offer concepts further utilizes at least one of the keyword components.

24. A targeting information creation server system, comprising:
 a server and storage;
 wherein the server is configured to:
  obtain source data describing a plurality of landing pages, where the landing pages include information describing a set of offers;
  obtain a list of initial keywords, where the keywords in the initial list of keywords comprise keyword components;
  build a taxonomy based on the source data and the initial list of keywords, where the taxonomy uniquely maps the plurality of landing pages to categories and attributes and also maps the keyword components to the categories and attributes;
  specify target concepts based on combinations of keyword components from the initial keywords, where each target concept has a specific set of categories and attributes within the taxonomy defined based upon the different categories and attributes of the keyword components that are combined to form the target concept;
  identify a plurality of offer concepts based on the information describing the plurality of offers, where each offer concept is a specific set of categories and attributes within the taxonomy identified using the information describing the offer in the source data describing the plurality of landing pages;
  match target concepts to relevant offer concepts within the plurality of offer concepts based on the specific sets of categories and attributes within the taxonomy of the target and offer concepts; and
  once a specific offer concept is matched as relevant to a specific target concept, identifying targeting information for one or more of the plurality of landing pages based on the attributes within the taxonomy of the specific target concept that matches the relevant offer concept for the landing page.

* * * * *